A. & L. CHRONIK.
KINETOGRAPHIC APPARATUS.
APPLICATION FILED MAR. 10, 1913.
1,106,080.
Patented Aug. 4, 1914.
2 SHEETS—SHEET 1.
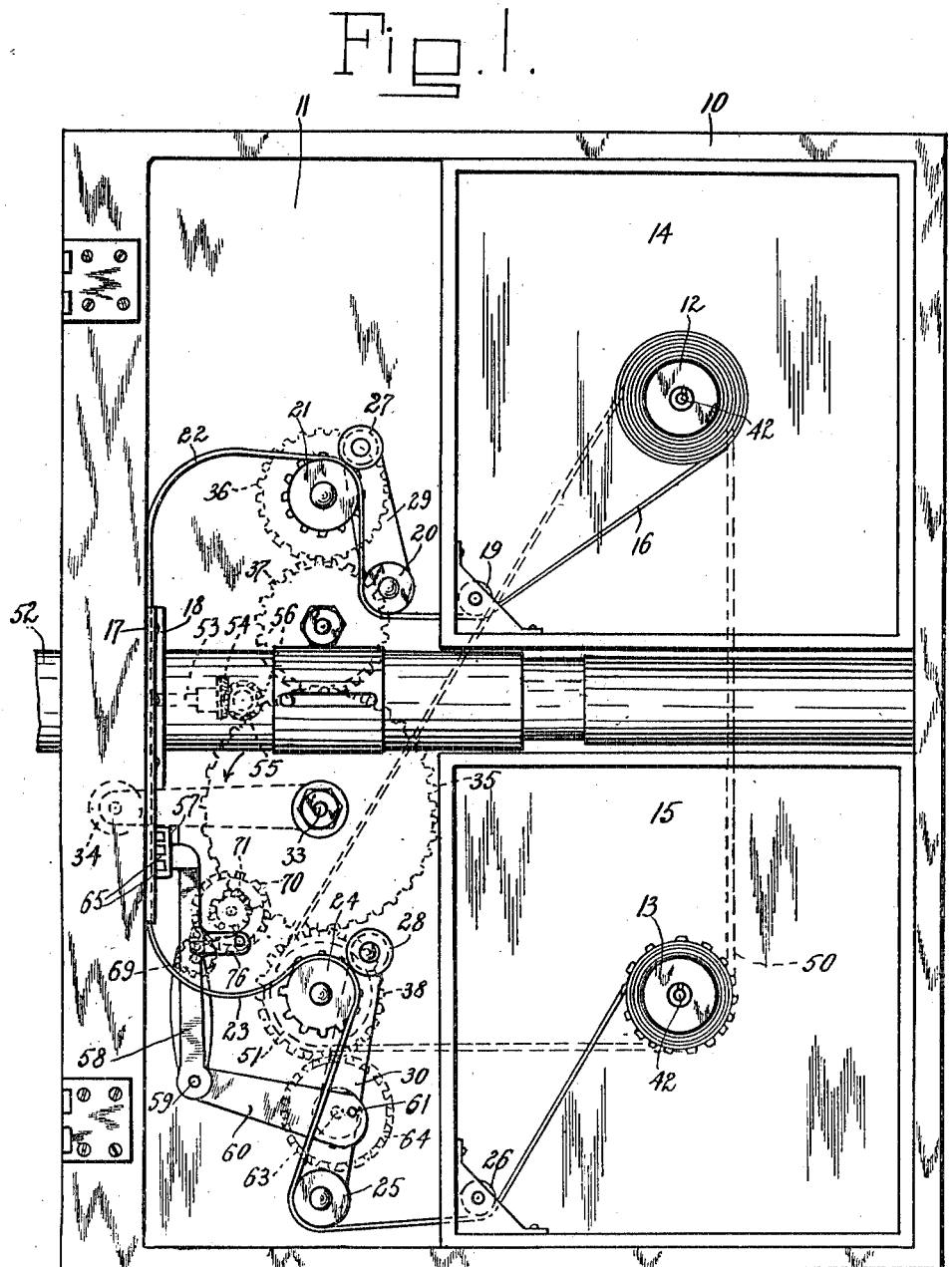
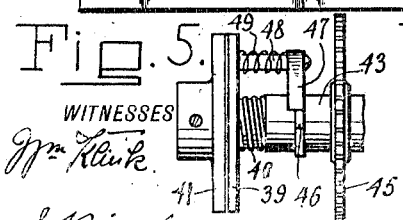
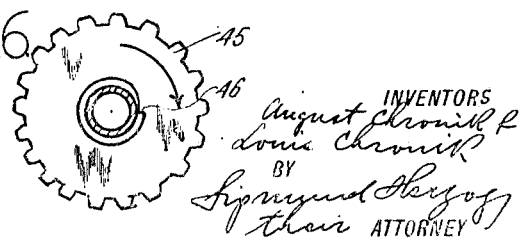

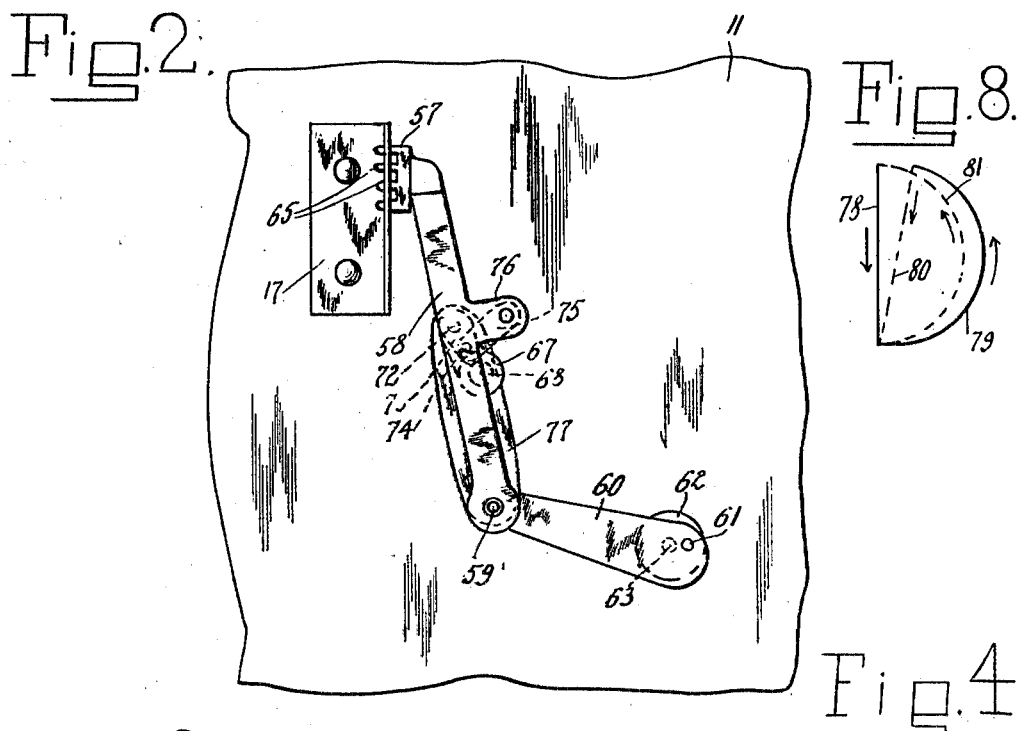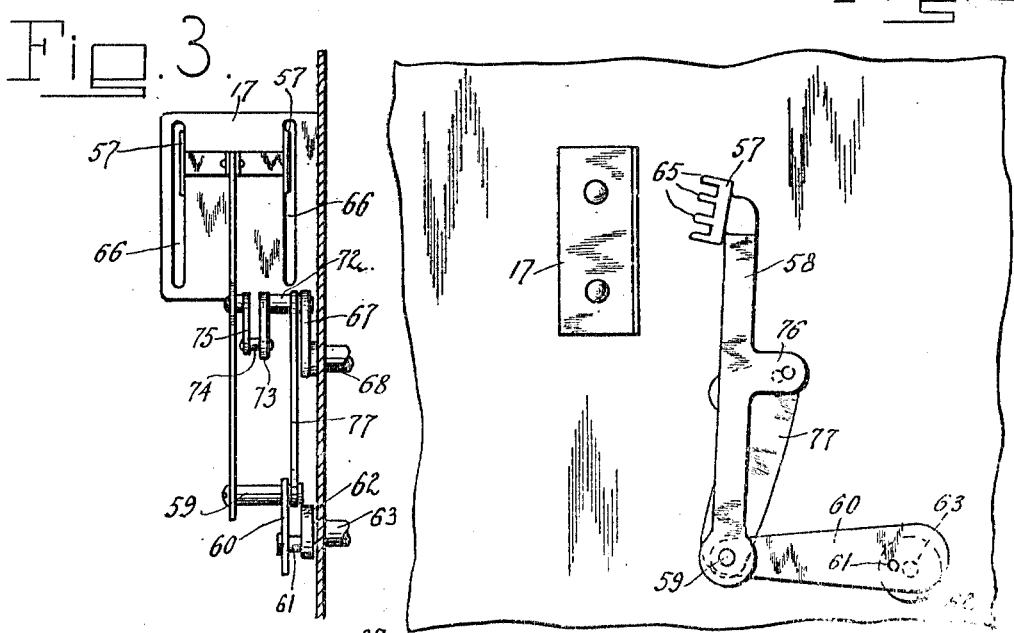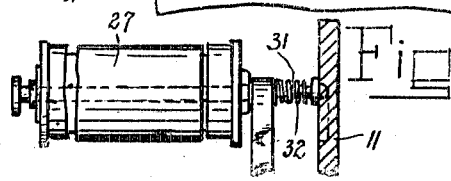

UNITED STATES PATENT OFFICE.

AUGUST CHRONIK AND LOUIS CHRONIK, OF NEW YORK, N. Y.

KINETOGRAPHIC APPARATUS.

1,106,080.     Specification of Letters Patent.    Patented Aug. 4, 1914.

Application filed March 10, 1913. Serial No. 753,397.

*To all whom it may concern:*

Be it known that we, AUGUST CHRONIK and LOUIS CHRONIK, citizens of the United States, and residents of the city of New York, in the county of New York and State of New York, have invented certain new and useful Improvements in Kinetographic Apparatus, of which the following is a specification.

The present invention relates to an apparatus for the exhibiting or taking, respectively, of moving picture films, that is to say to a machine for exhibiting or taking, respectively, in rapid succession a series of photographs of a moving object or objects in such a manner as to reproduce an exact picture of the scene or object.

The invention relates particularly to the mechanism for imparting an intermittent motion to the film past the exposure opening.

In most of the machines heretofore used the feeding mechanism consists of an intermittently rotating sprocket, to which motion is imparted by a suitable mechanism, for instance the well known "cross and pin" mechanism. It has been found in practice that the parts of this mechanism wear rapidly and have to be replaced at comparatively short intervals. Other feeding mechanisms comprise one or more fingers having a bodily oscillating movement, which upon the downstroke of their oscillation engage the film and advance it past the exposure opening, their upward strokes being idle. The devices of the second type are objectionable for the reason that an absolute register of the pictures of the film, or of the portions of the film on which the pictures are to be taken, is almost impossible.

One of the objects of the present invention is to provide a simple and effective feeding mechanism for kinetographic apparatus, which obviates the defects above mentioned in that its parts are not subjected to quick wear, and in that it insures a positive motion of the film and an absolute register with the exposure opening.

Another object of the invention is to provide a kinetographic apparatus in which all shafts or arbors rotate continuously notwithstanding the fact that the film is moved intermittently past the exposure opening.

A further object of the invention is to construct a kinetographic apparatus in which the supply- and wind-up reels are adapted to move without any readjustment of the parts in both directions.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a side elevation of the mechanism of an apparatus constructed in accordance with the present invention, the cover of the inclosing casing being removed in order to more clearly show the interior construction; Fig. 2 is a side elevation of the film feeding mechanism; Fig. 3 is a rear elevation thereof; Fig. 4 is a side elevation of the feeding mechanism, its parts being shown in other positions; Fig. 5 is a front elevation of a clutch mechanism upon the reels; Fig. 6 is a side elevation of a portion of said clutch; Fig. 7 is a front elevation of one of the guide rollers of the apparatus; and Fig. 8 is a diagram of the movement of the feeding fingers.

In the drawings the invention is shown in the form of a kinetographic camera, but the same, as will be hereinafter explained, is applicable to a projecting apparatus, the feeding mechanism being in both cases alike.

In the drawings, the numeral 10 indicates a suitable casing, adapted to inclose the mechanism and to exclude the light, such casing having a vertical partition 11, which serves to support the parts of the mechanism.

The numeral 12 denotes the supply reel, and the numeral 13 the wind-up reel, both of the same being arranged in light-proof compartments 14 and 15, respectively. The mechanism for intermittently feeding the film 16 past the exposure opening is arranged in the casing 10 outside of the compartments 14 and 15. This exposure opening is formed in a plate 17, with which is associated the gate 18, the latter being hinged in any suitable manner to the said plate, so that it may be readily opened to permit the film to be threaded over the sprockets hereinafter to be described. The exposure opening corresponds in size to that of an individual picture. The film is led from the supply reel over idlers 19 and 20 to a continuously rotating sprocket 21, forming a loop 22 before it passes between the plate 17 and the gate 18, also a loop 23 between the said plate and a continuously rotating sprocket 24, over which the film passes to idlers 25 and 26, and thence to the wind-up reel 13. With the sprockets 21 and 24 are associated grooved idlers 27 and 28, respectively, said idlers being carried by arms 29 and 30, respectively, and serve to keep the film continuously in engagement with the said sprockets. The shafts 31 of the idlers 27 and 28 are slidable relative to the said idlers, and kept by means of springs 32 in engagement with their bearings in the casing 10, as clearly shown in Fig. 7 of the drawings. If the shafts are shifted longitudinally, the idlers 27 and 28 can be swung around the pivots of their arms to permit the film to be threaded over the sprockets 21 and 24, respectively.

Movement is imparted to the main driving shaft 33 of the apparatus by means of a crank 34, which is arranged outside of the casing. To this main shaft is keyed, or otherwise attached, a large spur gear 35, the motion of which is transmitted to the continuously rotating sprockets 21 and 24. For this purpose the shaft of the sprocket 21 carries a pinion 36, meshing with a pinion 37, the latter being actuated by the gear 35. To the shaft of the sprocket 24 is fixedly attached a pinion 38 in mesh with the gear 35.

When the film is fed past the exposure opening in the normal direction, the wind-up reel 13 must be rotated, the supply reel 12 being then loosely mounted upon its shaft. If the film is fed backward, the supply reel 12 must be rotated in the proper direction, the wind-up reel 13 then running idle. The connections between the reels and their spindles are made by friction clutches, one of the same being shown in Figs. 5 and 6 of the drawings. This clutch comprises a disk 39, which is held by means of a spring 40 against a disk 41, the latter being fixedly attached to a spindle 42, over which is drawn a sleeve 43, with which the reel is in engagement. On the spindle is furthermore loosely mounted a sprocket wheel 45, the hub of said sprocket being provided with a ratchet tooth 46, the latter being adapted to be engaged by a pawl 47, which is pivoted to a pin 48, that is carried by the disk 39. The pawl is under the action of a spring 49, which keeps the same continuously in engagement with the hub of the sprocket wheel 45. Over the sprocket wheels 45, associated with the two reels, runs a chain 50, the latter being in driving engagement with a sprocket wheel 51, which is fastened to the arbor of the continuously rotating sprocket 24. The ratchet teeth 46 of the two sprocket wheels 45 are disposed in opposite directions, and the pawls 47 thereof are arranged upon opposite sides of the spindles 42. When, therefore, the spur gear 35 is rotated in the direction of the arrow, shown in Fig. 1 of the drawings, the sprocket wheel 45 of the wind-up reel 13 will by the intermediary of the ratchet tooth 46 and its pawl 47 rotate the disk 39, the motion of which will be transmitted by friction to the disk 41, and thus to the wind-up reel. No driving connection will exist in this case between the supply reel 12 and its corresponding sprocket wheel. If, however, the direction of rotation of the spur gear 35 is reversed, a driving connection will immediately be established by the ratchet tooth and pawl of the clutch of the supply reel, the driving connection being discontinued between the corresponding parts of the wind-up reel. The film will thus be supplied from the wind-up reel and wound upon the supply reel. It is obvious that while herein a particular arrangement has been shown for actuating the reels, any other suitable construction may be made use of.

The lens of the camera is arranged with a casing 52, the latter being in alinement with the exposure opening, and between this casing and the plate 17 is mounted a shutter (not shown in the drawings), the said shutter being attached to a shaft 53, to which is keyed a bevel gear 54, in mesh with a similar gear 55, to the spindle of the latter being secured a pinion 56, the teeth of which mesh with those of the spur gear 35.

The means for intermittently feeding the film past the exposure opening is shown in details in Figs. 2 to 4, inclusive, and comprises two feeding fingers 57, which are carried by an arm 58, that is fulcrumed at 59 to an arm 60, the latter being pivoted eccentrically at 61 to a disk 62, which is mounted upon an arbor 63. To this arbor is keyed a pinion 64, in mesh with the pinion 38 above described. The fingers 57 are each provided with a plurality of prongs 65, which are adapted to engage the two rows of marginal perforations in the film band 16. To permit of such engagement, the plate 17 is provided with two vertical slots 66 in alinement with the perforations in the film. The arm 58 is actuated by means of a crank 67, the shaft 68 of which carries a pinion 69, in mesh with a pinion 70, upon the spindle of which is mounted a pinion 71, the latter meshing with the spur gear 35. The dimensions of the pinions 64 and the train of gears actuating the shaft 68 are such that the latter will make one revolution while the arbor 63 makes two revolutions. The purpose of this arrangement will be hereinafter explained. To the pin 72 of the crank 67 is attached a second crank, denoted by the numeral 73. The longitudinal axes of the two cranks register, the arm of the second crank projecting toward the shaft 68 of the first crank, as clearly shown in the drawings. The pin 74 of the crank 73 is pivotally connected by a link 75 with a rearwardly projecting extension 76 of the arm 58, and the pin 72 of the crank 67 is in a similar manner connected by a link 77 with the pivot 59, which makes the connection between the arms 58 and 60.

The operation of this device is as follows: The sprockets 21 and 24 are continuously rotated with a result that the film band is continuously unwound from the supply reel 12 and rewound upon the wind-up reel 13. The crankshaft 68 and the disk 62 rotate also continuously, actuate, however, the feeding fingers 57 in such a manner that an intermittent movement of the film is obtained past the exposure opening.

In Fig. 2 of the drawings the feeding fingers are shown in their uppermost positions, in which they are brought into engagement with the perforations in the film. In this position the crank 67 has just past its upper dead center and the pivot 61 of the arm 60 is located in a horizontal line passing through the center of the disk 62. As now the crank 67 and the disk 62 are being rotated, the prongs 65 of the feeding fingers move in a vertical line downward and feed the film accordingly past the exposure opening. This vertical line is indicated in the diagram, shown in Fig. 8 of the drawings, by the numeral 78. When the crank 67 passes its lower dead center, the prongs 65 are disengaged from the film, and then move in a curved line, indicated by the numeral 79, upward. The uppermost portion of this curved line does, however, not coincide with the uppermost point of the vertical line 78 for the reason that the pivot 61 has in the meantime moved with the disk 62 in such a manner as to cause the arm 58 to swing outward around the pivot 59, (Fig. 4). It is to be observed that while the crank has completed one revolution, the disk 62 has turned through an angular distance of 180°. During the next half revolution of the crank 67 the fingers move in a straight line 80 downward, and are not in engagement with the perforations in the film, said straight line being arranged at an angle to the vertical line 78, and during the next half revolution, the fingers move in a curved line 81 upward, and are brought at the end of said half revolution again into engagement with the apertures in the film band, the disk 62 having in the meantime completed a revolution.

From the foregoing it will be noted that the shifting of the film, that is to say the movement between one position and the next, is made in a comparatively short time, the exposure lasting a longer time, that is to say while the crank 67 completes one and one-half revolution. It is to be observed that, if the pivot 61 coincides with the arbor 63, the latter need not be driven, and the fingers will engage the film at each downward stroke thereof. This arrangement might be found to be advantageous under certain conditions.

While herein a camera has been shown and described, it is obvious that the device can be just as well made use of in a projecting apparatus. If used for the latter purpose, obviously the supply reel and the wind-up reel need not be inclosed in a light-proof casing; furthermore a source of light in combination with suitable lenses must be provided. These changes are, however, so obvious to those skilled in the art that a further discussion thereof seems to be unnecessary.

What we claim is:—

1. In a kinetographic apparatus, reciprocating means for imparting to a portion of the film an intermittent motion, said means comprising an arm having a plurality of feeding fingers adapted to engage the perforations in the film, a swinging arm pivoted to said first named arm, a crank, a link connecting the pin of said crank with said second named arm, a second crank attached to the pin of said first crank, a link connecting the pin of said second crank and said first named arm, and means for imparting a continuous rotation to the shaft of said first crank.

2. In a kinetographic apparatus, reciprocating means for imparting to a portion of the film an intermittent motion, said means comprising an arm having a plurality of feeding fingers adapted to engage the perforations in the film, a swinging arm pivoted to said first named arm, a crank, a link connecting the pin of said crank with said second named arm, a second crank attached to the pin of said first crank, the axes of said two cranks being in alinement and the arm of said second crank projecting toward the shaft of said first crank, a link connecting the pin of said second crank and said first named arm, and means for imparting a continuous rotation to the shaft of said first crank.

3. In a kinetographic apparatus, reciprocating means for imparting to a portion of the film an intermittent motion, said means comprising an arm having a plurality of feeding fingers adapted to engage the perforations in the film, a disk, an arm eccentrically pivoted to said disk and to said first named arm, a crank, a link connecting the pin of said crank with said second named arm, a second crank attached to the pin of said first crank, a link connecting the pin of said second crank and said first named arm, and means for imparting a continuous rotation to said disk and to the shaft of said first crank.

4. In a kinetographic apparatus, reciprocating means for imparting to a portion of the film an intermittent motion, said means comprising an arm having a plurality of feeding fingers adapted to engage the perforations in the film, a disk, an arm eccentrically pivoted to said disk and to said first named arm, a crank, a link connecting the pin of said crank with said second named arm, a second crank attached to the pin of said first crank, a link connecting the pin of said second crank to said first named arm, and means for imparting a continuous rotation to said disk and to the shaft of said first crank, said first named crank making two complete revolutions while said disk makes one revolution.

5. In a kinetographic apparatus, reciprocating means for imparting to a portion of the film an intermittent motion, said means comprising an arm having a plurality of feeding fingers adapted to engage the perforations in the film, a disk, an arm eccentrically pivoted to said disk and to said first named arm, a crank, a link connecting the pin of said crank with said second named arm, a second crank attached to the pin of said first crank, the axes of said two cranks being in alinement and the arm of said second crank projecting toward the shaft of said first crank, a link connecting the pin of said second crank and said first named arm, and means for imparting a continuous rotation to said disk and to the shaft of said first crank.

6. In a kinetographic apparatus, reciprocating means for imparting to a portion of the film an intermittent motion, said means comprising an arm having a plurality of feeding fingers adapted to engage the perforations in the film, a disk, an arm eccentrically pivoted to said disk and to said first named arm, a crank, a link connecting the pin of said crank with said second named arm, a second crank attached to the pin of said first crank, the axes of said two cranks being in alinement and the arm of said second crank projecting toward the shaft of said first crank, a link connecting the pin of said second crank and said first named arm, and means for imparting a continuous rotation to said disk and to the shaft of said first crank, said disk making one complete revolution while said first named crank makes two revolutions.

Signed at New York, in the county of New York and State of New York, this 27th day of February, A. D. 1913.

AUGUST CHRONIK.
LOUIS CHRONIK.

Witnesses:
SIGMUND HERZOG,
S. BIRNBAUM.